May 5, 1931. O. C. SNYDER 1,803,874

NUT LOCK

Filed Jan. 28, 1929

Inventor

O. C. Snyder.

By Lacey & Lacey, Attorneys

Patented May 5, 1931

1,803,874

UNITED STATES PATENT OFFICE

ORLOW C. SNYDER, OF LONG ISLAND CITY, NEW YORK

NUT LOCK

Application filed January 28, 1929. Serial No. 335,630.

The present invention is directed to improvements in nut locks.

The primary object of the invention is to provide a nut lock so constructed that the nut will be held firmly united with the bolt to prevent relative rotation of the nut and bolt.

Another object of the invention is to provide a nut lock which is exceedingly simple in construction, durable, efficient in operation, and one which will positively prevent accidental disengagement of the nut from the bolt.

Another object of the invention is to provide a device of this character so constructed that a conventional form of bolt can be used upon merely grooving the same to provide means for retaining the locking ring.

Another object of the invention is to provide a nut lock so constructed that the locking ring will be effectively concealed and maintained in place to prevent removal of the nut without distortion of the locking means.

With these and other objects in view, this invention resides in the novel features of construction, formation, combination and arrangement of parts to be hereinafter more fully described, claimed and illustrated in the accompanying drawing, in which:—

Figure 1:
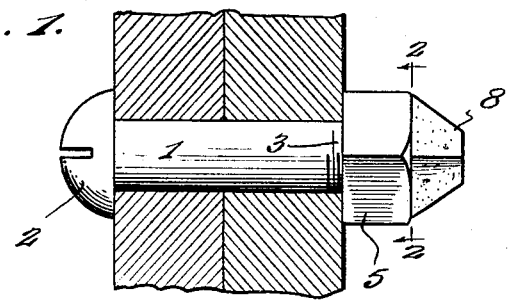
Figure 1 is a side elevation of the device, showing it in use in connection with the work.
Figure 2:
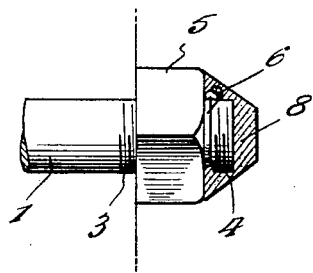
Figure 2 is a fragmentary side view, with parts broken away.
Figure 3:
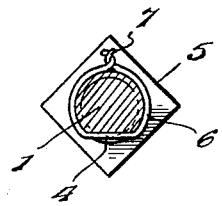
Figure 3 is a sectional view on line 2—2 of Figure 1.

Referring to the drawing, 1 designates a bolt having the usual head 2, and is threaded, as at 3. The threaded portion of the bolt is provided with a transverse groove 4, this groove is cut in the bolt at a predetermined distance from the end thereof in order that when the nut bears against the work the inner wall of the groove will be substantially in a plane with the outer surface of the nut 5.

Obviously the grooves may be cut in the bolts at various points so that the device will effectively operate with work varying in thickness.

The nut 5 is screwed upon the bolt, after which the split wire ring 6 is placed around the bolt with a portion thereof engaged in the groove. The terminals of the ring are then twisted, as at 7, to maintain the ring firmly secured to the bolt. Obviously the presence of the ring will prevent the nut from being accidentally disengaged under normal conditions, but in instances where the lock is used for comparatively heavy duty, or to parts which are subjected to considerable vibration, additional means are employed for preventing disengagement of the rings from the bolt.

In order to accomplish this I apply to the extended end of the bolt by a suitable mold, a cap 8 of solder. Obviously the solder will completely cover and conceal the ring to prevent any possibility of the terminals becoming loose, and since some of the solder will enter the groove 4 the ring will be positively held in place. It will be of course understood that the cap can be removed when the bolt or nut is subjected to abnormal strain with suitable tools.

Figure 4:
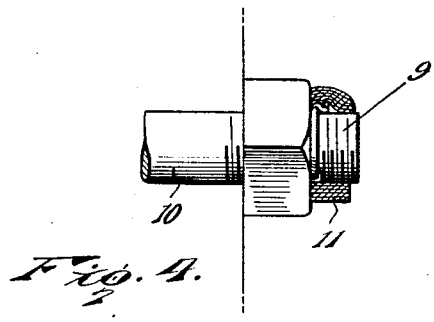
Figure 4 is a fragmentary side view, partly in section, of a modified form.

As shown in Figure 4 the ring 9 is engaged upon the bolt as in the preferred form of the invention, but in lieu of the solder cap, the extended end of the bolt is wrapped with adhesive tape 11, which will effectively retain the ring in place under normal conditions, or when the lock is used in connection with light work.

From the foregoing, it is thought that the construction, operation and many advantages of the herein described invention will be apparent to those skilled in the art, without further description, and it will be understood that various changes in the size, shape, and proportion and minor details of construction may be resorted to without departing from the spirit or sacrificing any of the advantages of the invention.

What is claimed is:—

A nut lock comprising in combination with a bolt and a nut threaded thereon, of a flat seat formed on one side of the bolt, said bolt having a groove around its threaded portion, said groove passing through said flat seat, a comparatively stiff wire ring seated in said groove and having the ends twisted together and extending radially from the axis of the bolt opposite said seat, and a solder cap enveloping said seat, said ring and the twisted together ends of the ring, and entering said groove, said solder cap binding together in a rigid unitary assembly the ring the nut and the bolt.

In testimony whereof I affix my signature.

ORLOW C. SNYDER. [L. S.]